United States Patent Office 3,501,557
Patented Mar. 17, 1970

3,501,557
PROCESS FOR PREPARING 2-AMINOETHYL-
THIOPHOSPHATE SALTS
Stanley J. Brois, Matawan, N.J., assignor to Esso Research
and Engineering Company, a corporation of Delaware
No Drawing. Filed May 2, 1966, Ser. No. 546,573
Int. Cl. C07f 9/16
U.S. Cl. 260—978 6 Claims

ABSTRACT OF THE DISCLOSURE 2-aminoethylthiophosphates are prepared in a suitable solvent at low temperatures by reacting an aziridine with thiophosphoric acid. The resulting products have utility as antiradiation and antiarthritic agents.

---

The present invention relates to 2-aminoethylthiophosphates, also designated as S(2 - aminoethyl)phosphorothioates. In general, it concerns an improved process for preparing 2-aminoethylthiophosphates and to novel compounds comprising 2-aminoethylthiophosphates. In particular, the instant invention relates to a novel process for preparing 2 - aminoethylthiophosphates and compounds having the following general formula:

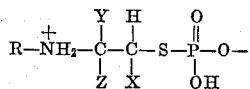

where R is selected from the group consisting of hydrogen, alkyl, cycloalkyl, arakyl, or aryl radicals. In addition, the alkyl radical may contain functional groups which include but are not limited to amine, ester, amide, imide, carbamate, guanidine, ketone, hydrazine, semicarbazone, urea, and thiourea substituents. The letters X, Y, and Z are the same or different and may be selected from the group consisting of hydrogen, alkyl or aryl radicals.

The present invention therefore provides a process for preparing 2-aminoethylthiophosphates which comprises reacting an aziridine with said thiophosphoric acid at low temperatures in a suitable solvent.

Briefly, the process of the present invention involves reacting an aziridine with thiophosphoric acid (also known as phosphorothioic acid) at low temperatures, e.g. between —40° and 25° C., in a suitable solvent, e.g., methanol.

The term aziridine as employed herein is a generic term covering ethylenimine and ethylenimine derivatives. Aziridines suitable for use in the present invention may be represented by the following formula:

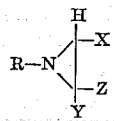

where R, X, Y and Z are as defined above.

Examples of suitable ethylenimine derivatives include but are not limited to alkyl and aryl aziridines and N-aziridylalkyl amines, esters, amides, imides, carbamates, guanidines, ketones, hydrazones, semicarbazones, ureas and thioureas.

The thio acid reactant employed in the process of the present invention is specifically thiophosphoric acid ($H_3PO_3S$). Preparations of thiophosphoric acid are well known to the art and per se form no basis of the present invention. A preferred method of preparing the thiophosphoric acid used as a reactant in the present invention is described in commonly assigned copending application, Ser. No. 437,315, filed Mar. 1, 1965, now U.S. Patent No. 3,337,465. Briefly, the preparation described in said copending application involves the direct production of thiophosphoric acid by the hydrolysis of a sulfide of phosphorus in the presence of an oxygen-containing organic compound at moderate temperature conditions. It is to be understood, however, that any method of preparing thiophosphoric acid may be employed in the present invention.

While it is not intended that the following limits the present invention in any respect, it is believed that the reaction between aziridine and thiophosphoric acid according to the present invention proceeds according to the $S_N2$ mechanism below. The thiophosphoric acid plays a dual role as proton donor (catalyst) and nucleophilic agent.

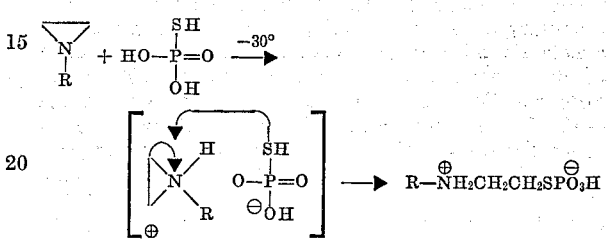

With unsymmetrical C-alkyl substituted aziridines, the nucleophile ($H_3PO_3S$) adds exclusively to the least substituted ring carbon. By contrast, aryl aziridines (styrenimines) undergo exclusive attack at the carbon bearing the aryl substituent.

In general, the process of the present invention involves the dropwise addition of an aziridine diluted in a suitable solvent to an equivalent amount of dilute, methanolic thiophosphoric acid at a temperature of about —40° to 25° C., preferably about —20° C. The inverse addition tends to induce the polymerization of the aziridine reactant. After the addition of the aziridine is complete, the reaction medium is allowed to warm to room temperature. As the reaction mixture is brought to room temperature, the product may precipitate from solution. Quantitative recovery of the product is usually assured by adding an excess of ether to the mixture. When the thiophosphate salt, by virtue of its structure, remains in solution at room temperature, the addition of ether or other suitable solvents miscible with the reaction solvent will ordinarily precipitate the salt from solution. The product may be recovered by filtration, washed, and dried in vacuo at about 25° C. Quantitative yields of analytically pure product are generally obtained. When necessary, the labile thiophosphate salts may be recrystallized under mild conditions from a variety of solvent or solvent mixtures including acetic acid, methanol, methanol-acetone, methanol-ether, water methanol, acetonitrile, N,N-dimethylformamide, N,N-dimethylacetamide, 1-methyl-2-pyrrolidinone, dimethylsulfoxide and the like.

The choice of a solvent system for recrystallization will, of course, be wholly contingent on the stability and solubility of each particular thiophosphate salt.

Suitable solvents for the aziridine include methanol, ethanol, ether, tetrahydrofuran, acetone, water, acetonitrile, N,N-dimethylformamide, N,N-dimethylacetamide, 1-methyl-2-pyrrolidinone, dimethylsulfoxide and the like. Obviously, the choice of solvent will depend on the solubility characteristics of the aziridine reactant.

While methanol is a preferred solvent for thiophosphoric acid, other inert solvents or solvent mixtures miscible with the thio acid may be employed. Such solvents or solvent mixtures include methanol, methanol-water, ethanol, ethanol-water, tetrahydrofuran, tetrahydrofuran-water, acetone-water, N.N-dimethylformamide, dimethylsulfoxide and the like. Generally, homogeneous reactions and facile product recovery can be realized with the appropriate choice of the above-described solvents.

In one particular embodiment of the present invention, ammonium salts of the 2-aminoethylthiophosphates can be very conveniently prepared by adding ammonia in a suitable solvent to the internal salt at temperatures of −20° to about 0° C. The formation of the ammonium 2-aminoethylthiophosphates may in some instances enhance the stability, increase the water solubility and simplify the isolation of the internal phosphorothioate salt.

The present invention can be further described by reference to the following examples. It is to be understood, however, that the examples are for purposes of illustration only and not intended to limit the scope of the present invention in any respect.

EXAMPLE 1

To a four-necked round bottom flask equipped with stirrer, thermometer, addition funnel and condenser and containing a 0.1 mole of thiophosphoric acid in approximately 200 ml. methanol was added dropwise a 0.1 mole of ethylenimine dissolved in approximately 200 ml. of methanol. The reaction mixture was maintained at about −30° C. Upon completion of aziridine addition, the reaction mixture was allowed to warm up to room temperature. After stirring for a short period, a solid white product separated from solution. The salt was filtered, washed several times with ether and dried in vacuo at 25° C. A quantitative yield of essentially pure 2-aminoethylthiophosphate, M.P. 156–157° C., was obtained. The infrared spectrum of the product was identical to that for an authentic sample of $$\overset{\oplus}{N}H_3CH_2CH_2SPO_3\overset{\ominus}{H}$$

*Analysis.*—Calculated for $C_2H_8NO_3PS$ (percent): C, 15.29; N, 8.91; S, 20.41; P, 19.72. Found (percent): C, 15.03; N, 8.79; S, 20.00; P, 19.54.

EXAMPLE 2

As in Example 1, 0.1 mole t-butyl aziridine dissolved in 100 ml. of methanol was added dropwise a methanolic solution of 0.1 mole of thiophosphoric acid. The reaction mixture was maintained at about −30° C. After aziridine addition was complete, the mixture was allowed to warm to about 25° C. After stirring at ambient temperature for several minutes, white crystalline product separated from solution. The salt was filtered, washed with ether several times and dried under high vacuum at room temperature overnight. A quantitative yield of 2-t-butylaminoethylthiophosphate, M.P. 190–192° C., was obtained, its infrared spectrum showed characteristic absorption bands at 8.65, 9.3–9.5 and 11.2 microns.

*Analysis.*—Calculated for $C_6H_{16}NO_3PS$ (percent): C, 33.79; N, 6.56; S, 15.03. Found (percent): C, 33.69; N, 6.42; S, 15.30.

The process of the present invention affords several important advantages over the conventional synthetic routes to thiophosphates. For example, the conventional syntheses of 2-aminoethylthiophosphate salts involve the acid-catalyzed reaction of ethylenimines or ethylenimine precursors such as 2-haloethylamine hydrohalides with trisodium phosphorothioate ($Na_3PO_3S$) [S. Akerfeldt, Acta. Chem. Scand. 17, 329 (1963)]. In the prior art processes, the preparation of the nucleophilic reagent, namely, $Na_3PO_3S$, is a very tedious, time-consuming operation. In addition, due to the limited solubility of $Na_3PO_3S$, reactions with this nucleophilic salt are restrictive to water solution. Thus, only water soluble aziridines or 2-haloethylamine hydrohalides can be employed in the conventional syntheses if heterogeneous reaction masses are to be avoided. Moreover, acid reagents added to catalyze the reaction between aziridine and trisodium phosphorothioate tend to promote ethylenimine polymerization. Finally, the isolation and purification of the labile thiophosphate salts produced by the conventional syntheses present serious difficulties; for example, the easily hydrolyzable phosphorothioates must be isolated from the inorganic salts formed in the conventional processes. Subsequent recrystallization usually affords low yields of 2-aminoethylthiophosphate salts. In contrast, the process of the present invention which employs thiophosphoric acid in a suitable solvent, for example, methanol at relatively low temperatures, for example, −30° C. avoids all of the shortcomings of the above-mentioned conventional methods of synthesizing 2-aminoethylthiophosphates and in addition enables the synthesis of novel thiophosphates which novel compounds could not practically be synthesized by conventional methods.

EXAMPLE 3

Alkyl and aryl substituted 2-aminoethylthiophosphates were prepared in high purity using the same general procedure of the present invention as set forth in Examples 1 and 2. Several of the compounds thus obtained in very high yields are shown in Table I. Recrystallization of these salts was unnecessary. The infrared spectrum for the salts depicted in Table I are entirely consistent with the proposed structures.

TABLE I.—ALKYL AND ARYL ANALOGS OF 2-AMINOETHYLTHIOPHOSPHATE

| Salt | M.P. (°C.) | Analyses | | | |
|---|---|---|---|---|---|
| | | C | N | S | P |
| $\overset{+}{N}H_3\overset{Me}{\underset{|}{C}H}CH_2SPO_3\overset{-}{H}$ | 155–157 | *21.05<br>**21.05 | 8.18<br>8.20 | 18.73<br>18.99 | 18.10<br>18.60 |
| $\overset{+}{N}H_3\overset{Et}{\underset{|}{C}H}CH_2SPO_3\overset{-}{H}$ | 158–160 | 25.94<br>25.79 | 7.56<br>7.72 | 17.32<br>17.30 | 16.73<br>16.28 |
| $\overset{+}{N}H_3\overset{Me}{\underset{\underset{Me}{|}}{C}}CH_2SPO_3\overset{-}{H}$ | 220–222 | 25.94<br>25.72 | 7.56<br>7.48 | 17.32<br>17.50 | 16.73<br>16.22 |
| $Me\overset{+}{N}H_2CH_2CH_2SPO_3\overset{-}{H}$ | 148–150 | 21.05<br>21.30 | 8.18<br>8.23 | 18.73<br>18.25 | 18.10<br>182.5 |
| $n\text{-}Bu\overset{+}{N}H_2CH_2CH_2SPO_3\overset{-}{H}$ | 135 | 33.79<br>33.78 | 6.57<br>6.01 | 15.04<br>15.02 | 14.52<br>14.49 |
| $PhCH_2CH_2\overset{+}{N}H_2CH_2CH_2SPO_3\overset{-}{H}$ | 100–102 | 45.97<br>46.39 | 5.36<br>5.21 | 12.27<br>11.90 | 11.85<br>11.53 |
| $\overset{+}{N}H_3\overset{Me}{\underset{|}{C}H}-\overset{Ph}{\underset{|}{C}H}SPO_3\overset{-}{H}$ | 167–169 | 44.12<br>43.97 | 5.67<br>5.49 | 12.97<br>13.09 | 12.53<br>12.50 |
| $\overset{+}{N}H_3CH_2\overset{Ph}{\underset{|}{C}H}SPO_3\overset{+}{N}H_4$ | 136–139 | 38.39<br>38.75 | 11.20<br>11.10 | 12.81<br>12.91 | ------<br>------ |

*Theory. **Found.

EXAMPLE 4

Analytically pure monoester, diester, amide and imide substituted 2-aminoethylthiophosphates were prepared in high yield according to the present invention. According to the method set forth in Examples 1 and 2, the compounds obtained in this manner are shown in Table II.

TABLE II.—ESTER, AMIDE AND IMIDE ANALOGS OF 2-AMINOETHYLTHIOPHOSPHATE $R-\overset{+}{N}H_2CH_2CH_2SPO_3\overset{-}{H}$

| R | M.P. (°C.) | Analyses | | | |
|---|---|---|---|---|---|
| | | C | N | S | P |
| $MeO\overset{O}{\overset{\|}{C}}CH_2-$ | 130–132 | *26.19<br>**25.61 | 6.11<br>5.61 | 14.00<br>14.16 | 13.51<br>13.55 |
| $EtO\overset{O}{\overset{\|}{C}}CH_2-$ | 146–148 | 29.63<br>29.50 | 5.76<br>5.72 | 13.18<br>13.01 | 12.73<br>12.78 |
| $MeO\overset{O}{\overset{\|}{C}}CH_2CH_2-$ | 126–128 | 29.63<br>30.04 | 5.76<br>5.57 | 13.18<br>13.55 | 12.73<br>12.73 |
| $EtO\overset{O}{\overset{\|}{C}}CH_2CH_2-$ | 124–126 | 32.68<br>32.33 | 5.48<br>5.27 | 12.46<br>12.24 | 12.04<br>11.60 |
| $CF_3CH_2O\overset{O}{\overset{\|}{C}}CH_2CH_2-$ | 67–69 | 27.01<br>27.48 | 4.50<br>4.36 | 10.30<br>10.76 | 9.95<br>10.11 |

| R | M.P. (°C.) | C | N | S | P |
|---|---|---|---|---|---|
| CF$_3$CF$_2$CH$_2$OC(O)CH$_2$CH$_2$—[a] | 59–61 | 26.60 / 26.52 | 3.88 / 4.39 | 8.88 / 8.59 | 8.57 / 8.22 |
| CH$_2$=CHCH$_2$OC(O)CH$_2$CH$_2$— | 132–134 | 35.68 / 35.58 | 5.20 / 5.20 | 11.91 / 12.23 | 11.50 / 11.39 |
| HC≡CCH$_2$OC(O)CH$_2$CH$_2$— | 69–71 | 35.95 / 35.88 | 5.24 / 5.28 | 11.99 / 11.80 | 11.58 / 11.43 |
| i-BuOC(O)CH$_2$CH$_2$— | 131–132 | 37.89 / 38.31 | 4.91 / 4.94 | 11.24 / 11.29 | 10.86 / 10.89 |
| n-BuOC(O)CH$_2$CH$_2$— | 68–70 | 37.89 / 37.89 | 4.91 / 5.06 | 11.24 / 11.03 | 10.86 / 11.10 / 10.59 |
| CH$_3$(CH$_2$)$_5$—CH— / MeOC(O)—CH$_2$ | 97–99 | 44.02 / 44.26 | 4.28 / 4.36 | 9.79 / 9.60 | 9.46 / 9.51 |
| CH$_3$(CH$_2$)$_9$OC(O)CH$_2$CH$_2$ | 58–60 | 48.76 / 48.40 | 3.79 / 3.49 | 8.68 / 8.88 | 8.38 / 8.40 |
| CH$_3$(CH$_2$)$_{11}$OC(O)CH$_2$CH$_2$— | 107–109 | 51.36 / 51.02 | 3.52 / 3.71 | 8.06 / 8.08 | 7.79 / 7.64 |
| (thiophene)-OC(O)CH$_2$CH$_2$— | 76–78 | 42.42 / 42.31 | 4.50 / 4.87 | 10.30 / 10.07 | 9.95 / 9.82 |
| (indene-CH$_2$)-CH$_2$OC(O)CH$_2$CH$_2$— | 169–171 | 46.56 / 47.03 | 4.18 / 4.25 | 9.56 / 9.92 | 9.24 / 9.13 |
| Ph—CH— / MeOC(O)—CH$_2$ | 119–120 | 45.13 / 44.90 | 4.39 / 4.10 | 10.04 / 9.86 | 9.70 / 9.36 |
| Ph—CH— / EtOC(O)—CH$_2$ | 160–161 | 46.83 / 46.66 | 4.20 / 3.88 | 9.62 / 9.85 | 9.29 / 9.38 |
| EtOC(O)—CH— / EtOC(O)—CH$_2$ | 105–108 | 36.47 / 36.44 | 4.25 / 4.54 | 9.74 / 9.75 | 9.41 / 9.46 / 9.37 |
| i-PrOC(O)—CH— / i-PrOC(O)—CH$_2$ | 148–150 | 40.32 / 40.26 | 3.92 / 4.02 | 8.97 / 9.43 | 8.69 / 8.49 |
| n-PrOC(O)CH— / n-PrOC(O)CH$_2$ | 100–102 | 40.32 / 40.30 | 3.92 / 3.79 | 8.97 / 9.10 | 8.67 / 8.14 |
| i-BuOC(O)CH— / i-BuOC(O)CH$_2$ | 129–130 | 43.62 / 43.62 | 3.63 / 3.51 | 8.31 / 8.41 | 8.03 / 8.44 |
| NH$_2$C(O)CH$_2$CH$_2$— | 127–129 | 26.31 / 26.22 | 12.28 / 11.91 | 14.05 / 14.30 | 13.57 / 13.30 |
| HN(C(O)—CH—)(C(O)—CH$_2$) (succinimide) | [b] 128 | 28.35 / 28.61 | 4.68 / 5.00 | 12.61 / 12.81 | — |

\* Theory.   \*\*Found.
[a] Fluorine analysis: theory, 26.30; found, 26.40.
[b] Softening point.

EXAMPLE 5

Ketone, hydrazone, and semicarbazone substituted 2-aminoethylthiophosphates were prepared in excellent yield and high purity using the process of the present invention. Some of the compounds obtained in this manner are shown in Table III.

TABLE III.—KETONE, HYDRAZONE AND SEMICARBAZONE ANALOGS OF 2-AMINOETHYLTHIOPHOSPHATE $$R\overset{+}{N}H_2CH_2CH_2SP\overset{-}{O_3}H$$

| R | M.P. (°C.) | C | N | S | P |
|---|---|---|---|---|---|
| MeC(O)CH$_2$C(Me)$_2$— | 142–145 | *37.63 / **37.28 | 5.48 / 5.41 | 12.56 / 12.72 | 12.13 / 11.64 |
| MeC(O)CH$_2$CH$_2$NHCH(Me)—CH(Ph)— | 184–185 | 49.20 / 48.95 | 4.41 / 4.59 | 10.10 / 10.50 | 9.76 / 9.88 |
| cyclohexanone—CH—CH$_2$CH$_2$— | 127–129 | 46.59 / 46.30 | 4.53 / 4.74 | 10.37 / 10.50 | 10.01 / 10.43 |
| 4-Me-cyclohexanone-CMe$_2$— | 132–134 | 46.59 / 46.76 | 4.53 / 4.16 | 10.37 / 10.60 | 10.01 / 9.94 |
| MeC(=NNH$_2$)CH$_2$C(Me)$_2$— | 105–107 | 35.68 [b] / 35.84 | 7.49 / 7.76 | 11.91 / 12.35 | 11.50 / 11.41 |
| MeC(=NNHC(O)NHMe)CH$_2$C(Me)$_2$—[a] | 121–123 | 42.38 [b] / 42.35 | 7.93 / 8.04 | 8.70 / 8.68 | 8.41 / 7.97 |
| MeC(=NNHC(O)NH-thiophene)CH$_2$C(Me)$_2$—[a] | 122–124 | 45.67 [b] / 45.51 | 7.92 / 7.97 | 8.13 / 8.39 | 7.85 / 7.43 |
| MeC(=NNHC(O)NHPh)CH$_2$CH$_2$—[a] | 164–166 | 43.33 / 43.25 | 15.56 / 15.30 | 8.90 / 9.39 | 8.59 / 8.20 |
| MeC(=NNHC(O)NHPh)CH$_2$C(Me)—·H$_2$O | 128–130 | 44.32 / 44.60 | 13.79 / 13.64 | 7.89 / 7.70 | 7.62 / 7.33 |
| MeC(=NNHC(O)NH-naphthyl)CH$_2$C(Me)$_2$—[a] | 158–160 | 52.04 [b] / 52.30 | 6.21 / 6.39 | 7.31 / 7.65 | 7.06 / 6.86 |

\* Theory.   \*\*Found.
[a] Recrystallized from methanol.
[b] Hydrogen analysis.

EXAMPLE 6

Carbamate, urea, thiourea and guanidine substituted 2-aminoethylthiophosphate derivatives were likewise prepared in very high yields according to the present invention. Some of the compounds obtained in this manner are shown in Table IV.

It is apparent from the above examples that the present invention, in addition to providing an improved method of synthesizing 2-aminoethylthiophosphate, also provides novel derivatives of said compound.

What is claimed is:
1. A process for preparing 2-aminoethylthiophosphate salts of the formula:

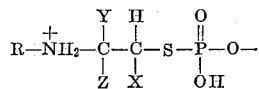

wherein R is a radical selected from the group consisting of hydrogen, alkyl, cycloalkyl, aralkyl and aryl; and TABLE IV.—CARBAMATE, UREA, THIOUREA AND GUANIDINE ANALOGS OF 2-AMINOETHYLTHIOPHOSPHATE $\overset{+}{\text{R}}\text{HN}_2\text{CH}_2\text{CH}_2\text{SPO}_3\overset{-}{\text{H}}$

| R | M.P. (°C.) | C | N | S | P |
|---|---|---|---|---|---|
| Me$_3$CNHC(O)—OCH$_2$CH$_2$— | 130–133 | *36.00 **36.80 | 9.33 9.70 | 10.68 10.32 | 10.31 9.88 |
| CH$_3$(CH$_2$)$_{17}$NHC(O)NHCH$_2$CH$_2$—a | b 65 | 55.73 55.50 | c 10.17 9.09 | 6.47 7.80 | 6.25 6.02 |
| CH$_3$(CH$_2$)$_{17}$NHC(O)HNCH$_2$CH$_2$CH$_2$—a | b 65 | 56.55 56.55 | c 10.28 10.78 | 6.29 6.57 | 6.08 5.95 |
| CH$_3$—C$_6$H$_4$—NHC(O)HNCH$_2$CH$_2$— | 112–115 | 43.24 42.86 | 12.61 12.49 | 9.62 9.33 | 9.29 9.02 |
| PhNHC(O)NH(CH$_2$)$_6$—  ·H$_2$O | 106–108 | 45.79 45.71 | 10.68 10.75 | 8.15 7.87 | 7.87 7.60 |
| Naphthyl-NHC(O)HNCH$_2$CH$_2$CH$_2$— | 171–173 | 50.12 49.61 | 10.96 11.25 | 9.36 8.85 | 8.08 8.16 |
| PhNHC(S)NHCH$_2$CH$_2$CH$_2$— | 116–118 | 41.24 40.91 | 12.03 11.71 | 18.35 18.69 | 8.86 8.91 |
| —PrNH\C(=NPr-i)—NHCH$_2$CH$_2$— | 118–120 | 40.48 40.22 | b 8.34 8.38 | 9.82 10.02 | -------- -------- |
| (Et,Et,Et-aryl) —NH—C(=N-aryl)—NHCH$_2$CH$_2$CH$_2$— | 99–101 | 55.00 55.02 | 12.22 11.80 | 6.99 6.70 | 6.75 6.37 |

*Theory. **Found.
a Recrystallized from glacial acetic acid-acetone.
b Softening point.
c Hydrogen analysis.

The utility of the process of the present invention is apparent to those skilled in the art from the above discussion. The products of the present invention, as will be apparent to those skilled in the art, will have utility as reactive intermediates for the synthesis of other useful chemical compounds. For example, the phosphorothioate salts are readily hydrolyzed to the corresponding thiols in hot dilute acid, thus providing a useful route to substituted mercaptoethyl amines. Furthermore, the thiophosphtaes may be readily oxidized to the corresponding disulfides, or under more vigorous conditions to sulfonic acids and their derivatives.

The present invention will have further utility in synthesizing antiradiation and antiarthritic agents.

wherein X, Y, and Z are the same or different and are radicals selected from the group consisting of hydrogen, alkyl, and aryl; which comprises reacting an aziridine of the formula:

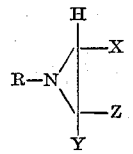

wherein R, X, Y, and Z are as defined above with thiophosphoric acid.

2. A process according to claim 1 wherein the temperature is between −40° C. and 25° C.

3. A process according to claim 1 wherein the solvent is methanol.

4. A process according to claim 1 wherein the aziridine is added dropwise to a methanolic solution of thiophosphoric acid.

5. A process according to claim 1 wherein the temperature is about −30° C.

6. A process according to claim 1 wherein the aziridine is ethylenimine.

References Cited

UNITED STATES PATENTS

| 3,392,215 | 7/1968 | Simone et al. | 260—978 |
| 2,895,983 | 7/1959 | Asseff | 260—978 |

CHARLES B. PARKER, Primary Examiner

R. L. RAYMOND, Assistant Examiner

U.S. Cl. X.R.

260—326.5, 470, 481, 503, 506, 508, 510, 513, 551, 552, 553, 554, 563, 564, 565, 570.5, 570.8 583, 584, 923, 924, 999